United States Patent
Lee et al.

(10) Patent No.: US 9,955,020 B2
(45) Date of Patent: Apr. 24, 2018

(54) CALL CONTROL METHOD BASED ON APPLICATION PRIORITY

(71) Applicant: Intel Corporation, Santa Clara, CA (US)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 14/802,214

(22) Filed: Jul. 17, 2015

(65) Prior Publication Data

US 2016/0021257 A1 Jan. 21, 2016

(30) Foreign Application Priority Data

Jul. 17, 2014 (CN) .......................... 2014 1 0342982

(51) Int. Cl.
| | |
|---|---|
| H04M 7/00 | (2006.01) |
| H04W 48/08 | (2009.01) |
| H04W 88/02 | (2009.01) |
| H04W 88/08 | (2009.01) |

(52) U.S. Cl.
CPC ............ *H04M 7/006* (2013.01); *H04W 48/08* (2013.01); *H04W 88/02* (2013.01); *H04W 88/08* (2013.01)

(58) Field of Classification Search
CPC ... H04M 7/006; H04W 72/005; H04W 48/08; H04W 88/02
See application file for complete search history.

(56) References Cited

U.S. PATENT DOCUMENTS

| | | | | |
|---|---|---|---|---|
| 2008/0205433 A1* | 8/2008 | Pihlaja | ............... | H04W 74/004 370/461 |
| 2009/0186624 A1* | 7/2009 | Cave | .................... | H04L 1/1887 455/450 |
| 2015/0119015 A1* | 4/2015 | Gai | ................... | H04W 36/0055 455/418 |
| 2017/0013541 A1* | 1/2017 | Jang | ..................... | H04W 4/005 |

FOREIGN PATENT DOCUMENTS

| | | |
|---|---|---|
| CN | 101114873 A | 1/2008 |
| CN | 102137433 A | 7/2011 |
| CN | 102761933 A | 10/2012 |
| CN | 102892177 A | 1/2013 |
| CN | 102958189 A | 3/2013 |
| CN | 103124416 A | 5/2013 |

OTHER PUBLICATIONS

Office Action dated Jan. 18, 2017 for Chinese Patent Application No. 201410342982.2.

* cited by examiner

*Primary Examiner* — Noel Beharry
*Assistant Examiner* — Ruihua Zhang
(74) *Attorney, Agent, or Firm* — Patent Capital Group (57) ABSTRACT

A call control method is provided. The call control method includes broadcasting a message with a base station, wherein the message includes a plurality of check values respectively corresponding to different types of applications; receiving the message with a terminal device; selecting, with the terminal device, the check value corresponding to a specific application initiated with the terminal device; performing, with the terminal device, a persistence test to initiate a call to the base station for the specific application according to the selected check value; and requesting a MAC layer of the terminal device to initiate an access procedure of the call when the persistence test is passed.

23 Claims, 6 Drawing Sheets

CALL CONTROL METHOD BASED ON APPLICATION PRIORITY

CROSS REFERENCE TO RELATED APPLICATION

The present application is based on, and claims priority from, China (International) Application Serial Number 201410342982.2, filed Jul. 17, 2014, the invention of which is hereby incorporated by reference herein in its entirety.

TECHNICAL FIELD

The disclosure relates to a call control method and the communication system thereof, and more particularly to the call control method and the communication system for whether to initiate an access procedure between a terminal device and a base station according to priority information.

BACKGROUND

Wireless communication system has been applied into various devices such as telephone, video, modem, or broadcast device. The multiple access technique can be applied in the wireless communication system to allow several earth stations to transmit in the same time span. This provides the way to network these stations together, either in a Star or a Mesh network. Common multiple access techniques include Frequency Division Multiple Access (FDMA), Time Division Multiple Access (TDMA), Code Division Multiple Access (CDMA) . . . etc.

These multiple access techniques have been applied in different communication standards and provided a common protocol such that different wireless devices can communicate in a city, in a country, in a region, or even in the whole earth. An example of utilizing the different communication standards is exHRPD, i.e. enhanced xHRPD. exHRPD is proposed by the organization for standardization 3GPP2 according to HRPD of the CDMA2000 evolution version. In existing HRPD spec, a persistence test scheme is used for the MAC layer to control the transmission over access channel. This control scheme has no knowledge of the types of application.

SUMMARY

An embodiment of the present disclosure provides a call control method. The call control method comprises broadcasting a message with a base station, wherein the message comprises a plurality of check values respectively corresponding to different types of applications; receiving the message with a terminal device; selecting, with the terminal device, the check value corresponding to a specific application initiated with the terminal device; performing, with the terminal device, a persistence test to initiate a call to the base station for the specific application according to the selected check value; and requesting a MAC layer of the terminal device to initiate an access procedure of the call when the persistence test is passed.

An embodiment of the present disclosure provides a communication system. The communication system comprises a base station and a terminal device. The base station is used to broadcast a message, wherein the message comprises a plurality of check values respectively corresponding to different types of applications. The terminal device is used to receive the message and select the check value corresponding to a specific application initiated by the terminal device, wherein the terminal device performs a persistence test to initiate a call to the base station for the specific application according to the selected check value; and wherein the terminal device requests a MAC layer of the terminal device to initiate an access procedure of the call when the persistence test is passed.

An embodiment of the present disclosure provides a call control method adapted to a base station. The call control method comprises broadcasting a message to a plurality of terminal devices with the base station, wherein the message comprises a plurality of check values respectively corresponding to different types of applications; and adjusting, with the base station, the check values of the message according to a network loading status of the base station, wherein the message is received by each of the terminal devices and each of the terminal devices performs a persistence test to initiate a call to the base station for a specific application initiated by the terminal device according to the check value corresponding to the specific application.

An embodiment of the present disclosure provides a call control method adapted to a terminal device. The call control method comprises receiving, with the terminal device, a message broadcasted with a base station, wherein the message comprises a plurality of check values respectively corresponding to different types of applications; selecting, with the terminal device, the check value corresponding to a specific application initiated by the terminal device; performing, with the terminal device, a persistence test to initiate a call to the base station for the specific application according to the selected check value; and requesting a MAC layer of the terminal device to initiate an access procedure of the call when the persistence test is passed.

An embodiment of the present disclosure provides a base station. The base station comprises a broadcasting unit and an adjustment unit. The broadcasting unit is used to broadcast a message to a plurality of terminal devices, wherein the message comprises a plurality of check values respectively corresponding to different types of applications. The adjustment unit is used to adjust the check values of the message according to a network loading status of the base station, wherein the message is received by each of the terminal devices and each of the terminal devices performs a persistence test to initiate a call to the base station for a specific application initiated by each of the terminal devices according to the check value corresponding to the specific application.

An embodiment of the present disclosure provides a terminal device. The terminal device comprises a receiving unit, a comparison unit and a processing unit. The receiving unit is used to receive a message broadcasted by a base station, wherein the message comprises a plurality of check values respectively corresponding to different types of applications. The comparison unit is used to select the check value corresponding to a specific application initiated by the terminal device and to perform a persistence test to initiate a call to the base station for the specific application according to the selected check value. The processing unit is used to request a MAC layer of the terminal device to initiate an access procedure of the call when the persistence test is passed.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

According to contribution AC20-20140715-007, it requires advanced access control scheme based on application priority. Voice call (VoIP) should be prioritized over SMS or vice versa. It depends on the situations and/or operator's policy. However current specs are not ready for this requirement, then it is predicted that the MSS wouldn't work well under the heavily congested situations.

In the present disclosure, a call control method is provided to introduce application priority based call control using a persistence based scheme, similar to the existing MAC control scheme. This scheme is to be implemented on top of MAC layer access control, for example, in connection layer or application layer.

Figure 1:
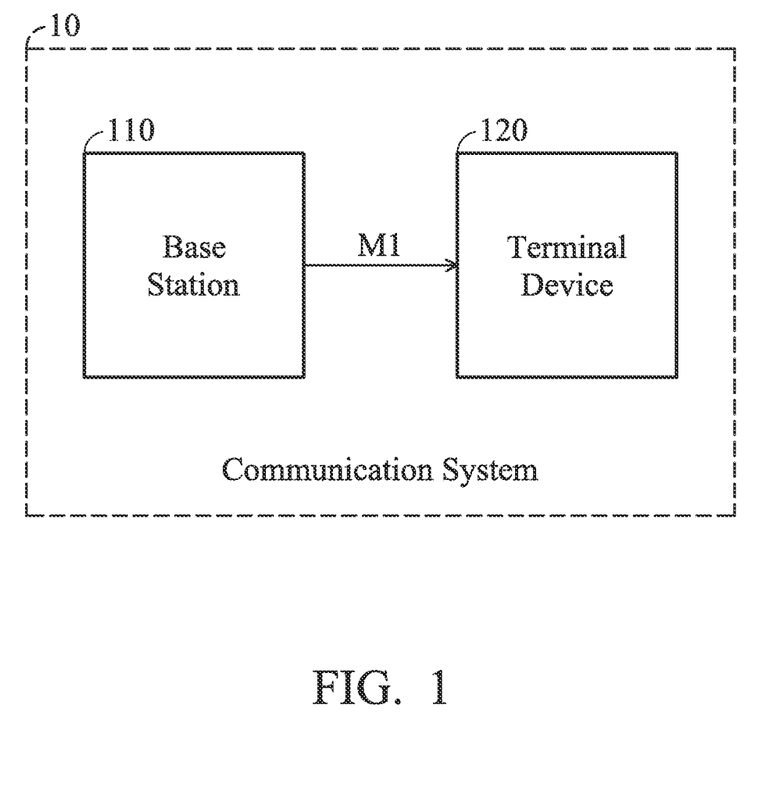
FIG. 1 shows a block diagram of a communication system 10 according to a first embodiment of the present disclosure.

FIG. 1 shows a block diagram of a communication system 10 according to a first embodiment of the present disclosure. The communication system 10 comprises a base station 110 and a terminal device 120. In the first embodiment, the base station 110 can be a fixed station or an access network for terminal communication. The base station 110 also can be an access point, a NodeB, an enhancement base station, an eNodeB, or other types of base station. In the first embodiment, the terminal device 120 can be a laptop or contained in a PDA. The terminal device 120 can be called as a user unit, a user station, a mobile station, a remote station, an access point, a remote terminal, an access terminal, a user terminal, or a user equipment etc. The terminal device 120 also can be a subscriber station, a wireless device, a cellular telephone, a cordless phone, a wireless local loop (WLL) station, a PDA, a handheld device with wireless function, or other processing devices which are connected to a wireless modem.

In the first embodiment, the base station 110 is used to broadcast a message M1, wherein the message M1 comprises a plurality of check values respectively corresponding to different types of applications. The different types of applications comprises a voice call (VoIP) application, a SMS application, an emergency service application, and a packet data application . . . etc. The terminal device 120 is used to receive the message M1 and select the check value corresponding to a specific application initiated by the terminal device 120. The terminal device 120 performs a persistence test to initiate a call to the base station for the specific application according to the selected check value. When the persistence test is passed, the terminal device 120 requests a MAC layer of the terminal device 120 to initiate an access procedure of the call.

In the first embodiment, the base station 110 adjusts the check values of the message according to a network loading status of the base station 110. After the check values of the message have been changed, the base station 110 broadcasts the amended message M1 to the terminal device 120.

In the first embodiment, the message M1 further comprises a waiting interval T1. If the persistence test fails, the terminal device 120 waits for the next persistence test according to the waiting interval T1. After the waiting interval T1 of time, the terminal device 120 preforms the persistence test again. For low latency tolerance, the waiting interval T1 is set between 0 second~2 seconds. For middle latency tolerance, the waiting interval T1 is set between 2 seconds~60 seconds. For long latency tolerance, the waiting interval T1 is set between 1 minute to 1 hour. For extremely long latency tolerance, the waiting interval T1 is larger than 1 hour. In the first embodiment, the waiting interval T1 also can be implemented by the terminal device 120 without the message M1. In the first embodiment, the base station 110 can adjust the waiting interval T1 of the terminal device 120 to reduce the incidence of the heavily congested situation.

In the first embodiment, the message M1 further comprises a retry count X1. In the first embodiment, the retry count X1 is used to determine a maximum number of times for repeatedly performing the persistence test. In addition, the retry count X1 also can be implemented by the terminal device 120 without the message M1.

In the first embodiment, the base station 110 broadcasts the message M1 over connection layer message or application layer message. For example, over QuickConfig message or SectorParameters message. In the first embodiment, the values of the QuickConfig message or the SectorParameters message can be updated according to the network loading status of the base station 110. In the first embodiment, the terminal device 120 connected to the base station 110 continuously checks the QuickConfig message or the SectorParameters message.

A second embodiment of the present disclosure illustrates the communication system 10 how to perform the persistence test. In the second embodiment, the check values are a plurality of persistence values corresponding to the different types of applications. In the second embodiment, the persistence value of each of the applications can be determined according to an access probability designed by the communication system 10. For example, as shown in Table 1, the persistence value of the VoIP application is an access probability A, the persistence value of the SMS application is an access probability B, the persistence value of the emergency service application is an access probability C, and the persistence value of the packet data application is an access probability D.

| App | Persistence value |
| --- | --- |
| VoIP | A |
| SMS | B |
| Emergency service | C |
| Packet data | D |
| . . . | . . . |

In the second embodiment, the terminal device 120 periodically checks the message M1 broadcasted from the base station 110. When the terminal device 120 receives the message M1 from the base station 110 and initiates a call for a specific application (for example, initiating a VoIP call), the terminal device 120 performs a persistence test over the connection layer or the application layer. At this time, the terminal device 120 generates a threshold value, wherein the threshold value is a random number located between 0 and 1. Because the persistence value of each of the applications is also located between 0 and 1, the range of the threshold value generated with the terminal device 120 can cover all of the persistence values. In the second embodiment, the random threshold value generated with the terminal device 120 meets the uniform distribution, but the present disclosure is not limited thereto. The person skilled in the art can choose other threshold value according to the above principle.

In the second embodiment, the terminal device 120 compares the threshold value with a selected persistence value corresponding to the specific application (for example, the persistence value A corresponding to the VoIP application). If the persistence value A is less than the threshold value, the terminal device 120 passes the persistence test and then requests a MAC layer of the terminal device 120 to initiate an access procedure of the VoIP call. If the persistence value A is equal to or larger than the threshold value, the terminal device 120 cannot pass the persistence test (the persistence test fails) and the terminal device 120 shall wait for the next persistence test according to the waiting interval T1.

In the second embodiment, the base station 110 can adjust the persistence values of the different types of applications according to the network loading status of the base station 110. When the network loading of the base station 110 becomes heavier, the base station 110 reduces the persistence values of the different types of applications. When the network loading of the base station 110 becomes less, the base station 110 increases the persistence values of the different types of applications.

A third embodiment of the present disclosure illustrates the communication system 10 how to perform the persistence test. In the third embodiment, the check values are implemented according to the priority of the different types of applications. In the third embodiment, the base station 110 controls a mapping between the applications and its priorities. For example, as shown in Table 2, the priority of the VoIP application is 2, the priority of the SMS application is 3, the priority of the emergency service application is 1, and the priority of the packet data application is 4. In the third embodiment, the base station 110 adjusts the priority of the different types of applications (i.e. the mapping) according to the network loading status of the base station 110.

| App | Priority |
|---|---|
| VoIP | 2 |
| SMS | 3 |
| Emergency service | 1 |
| Packet data | 4 |
| ... | ... |

In the third embodiment, the base station 110 further broadcast a priority threshold or the message M1 broadcasted with the base station 110 further comprises the priority threshold. When the terminal device 120 receives the message M1 from the base station 110 and initiates a call for a specific application (for example, initiating a VoIP call), the terminal device 120 performs a persistence test over the connection layer or the application layer. At this time, the terminal device 120 compares the priority threshold with the priority of the specific application (for example, the priority of the VoIP application). If the priority of the VoIP application is less than the priority threshold, the terminal device 120 passes the persistence test and then requests a MAC layer of the terminal device 120 to initiate an access procedure of the VoIP call. If the priority of the VoIP application is equal to or larger than the priority threshold, the terminal device 120 cannot pass the persistence test (the persistence test fails) and the terminal device 120 shall wait for the next persistence test according to the waiting interval T1.

In the third embodiment, the base station 110 adjusts the priority threshold according to the network loading status of the base station 110. When the network loading of the base station 110 becomes heavier, the base station 110 reduces the priority threshold. When the network loading of the base station 110 becomes less, the base station 110 increases the priority threshold. By adjusting the priority threshold, the base station 110 can control the distribution of accessing request initiated from the terminal devise 120 becoming more uniform and then reduce the incidence of the heavily congested situation of the network loading status.

Figure 2:
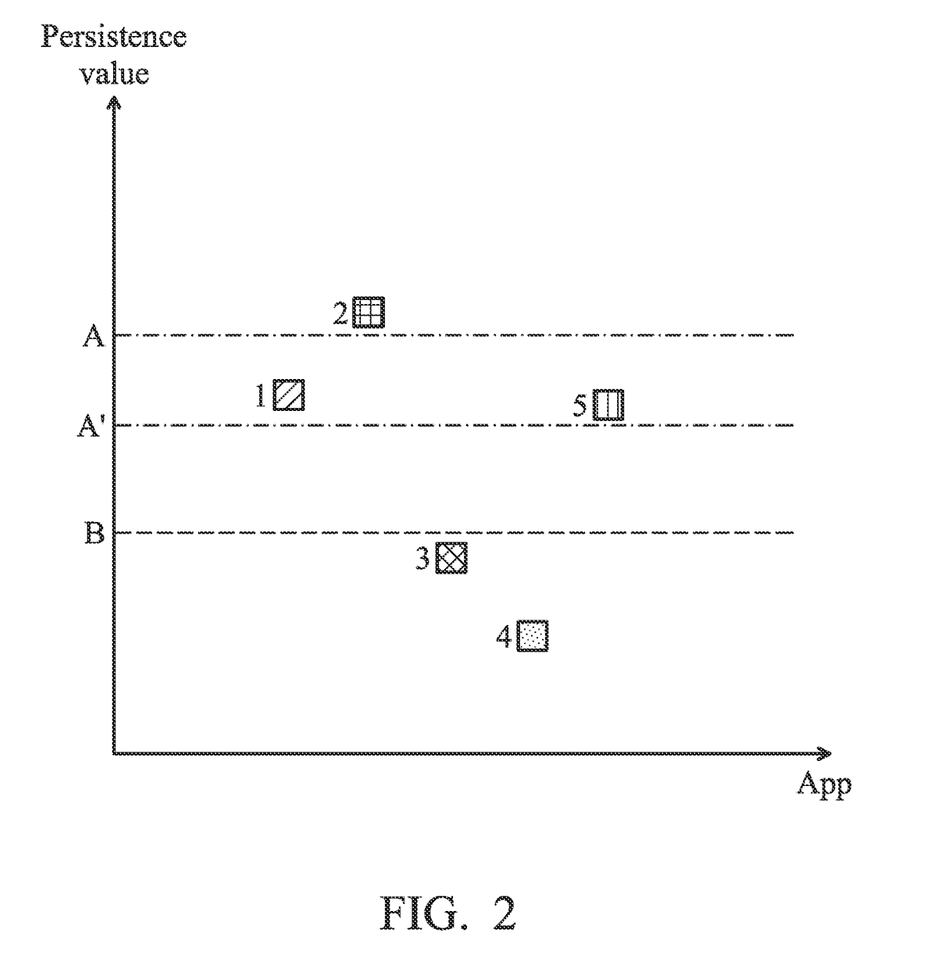
FIG. 2 shows a schematic diagram 20 illustrating a plurality of terminal devices 120 connect to the base station 110 according to a fourth embodiment of the present disclosure.

FIG. 2 shows a schematic diagram 20 illustrating a plurality of terminal devices 120 connect to the base station 110 according to a fourth embodiment of the present disclosure. In the fourth embodiment, the base station 110 broadcasts the message M1 comprising the persistence values to the terminal devices 120 (i.e. mobile stations 1, 2, 3, 4, 5 shown in FIG. 2). In the fourth embodiment, the mobile stations 1, 2, 3 prepare to initiate a VoIP access request, and the mobile stations 4, 5 prepare to initiate a SMS access request. In the fourth embodiment, the mobile stations 1, 2, 3 respectively generate random threshold values to compare with the persistence value A, and the mobile stations 4, 5 respectively generate random threshold values to compare with the persistence value B.

As shown in FIG. 2, the threshold values of the mobile stations 1, 3 are less than the persistence value A of the VoIP application, and the threshold values of the mobile station 4 is less than the persistence value B of the SMS application. Hence the mobile stations 1, 3, 4 succeed to connect to the base station 110 for the MAC layer communication. On the other hand, the mobile stations 2, 5 fail to connect to the base station 110. At this time, the mobile stations 2, 5 shall wait for the waiting interval to perform the persistence test again. When the mobile stations 2, 5 perform the persistence test again, the mobile stations 2, 5 shall regenerate another random threshold values to compare with the persistence values.

In the fourth embodiment, the base station 110 adjusts the persistence value according to the network loading status of the base station 110. For example, when the network loading of the base station 110 becomes heavier, the base station 110 adjusts the persistence value from A to A'. At this time, the threshold value generated with the mobile station 1 is larger than the new persistence value A' such that the mobile station 1 fails to connect to the base station 110. In the fourth embodiment, if the base station 110 adjusts the persistence values according to the network loading status, the mobile stations 1, 2, 3, 4, 5 should generate new threshold values (not shown in FIG. 2) for the persistence tests.

Figure 3:
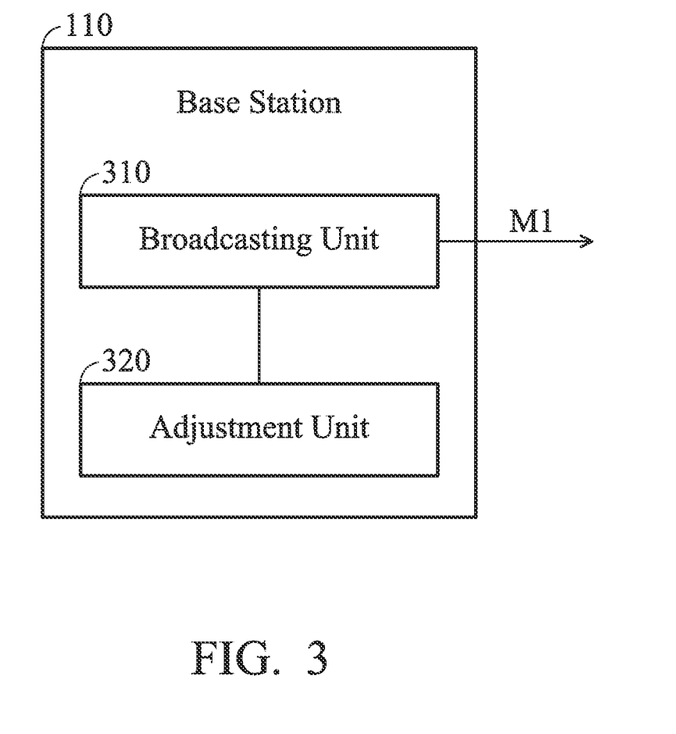
FIG. 3 shows a block diagram of the base station 110 according to a fifth embodiment of the present disclosure.

FIG. 3 shows a block diagram of the base station 110 according to a fifth embodiment of the present disclosure. In the fifth embodiment, the base station 110 comprises a broadcasting unit 310 and an adjustment unit 320. The broadcasting unit 310 is used to broadcast a message M1 to the terminal devices 120. The message M1 comprises a plurality of check values respectively corresponding to different types of applications. The adjustment unit 320 is used to adjust the check values of the message according to a network loading status of the base station, wherein the message M1 is received with each of the terminal devices 120 and each of the terminal devices 120 performs a persistence test to initiate a call to the base station 110 for a specific application initiated by each of the terminal devices 120 according to the check value corresponding to the specific application.

In the fifth embodiment, the message M1 further comprises a waiting interval T1 and a retry count X1. When the persistence test fails, the terminal device waits for the waiting interval T1 to perform the persistence test again. The retry count X1 is used to determine a maximum number of times for repeatedly performing the persistence test.

In the fifth embodiment, the broadcasting unit 310 further broadcasts a priority threshold. The check values are priorities of the different types of applications, and the priority threshold is used for the persistence test. The adjustment unit 320 is also used to adjust the priority threshold according to the network loading status of the base station. In the fifth embodiment, the broadcasting unit 310 and the adjustment unit 320 can be utilized in hardware, in a software unit executed by a processor, or a combination of the two.

Figure 4:
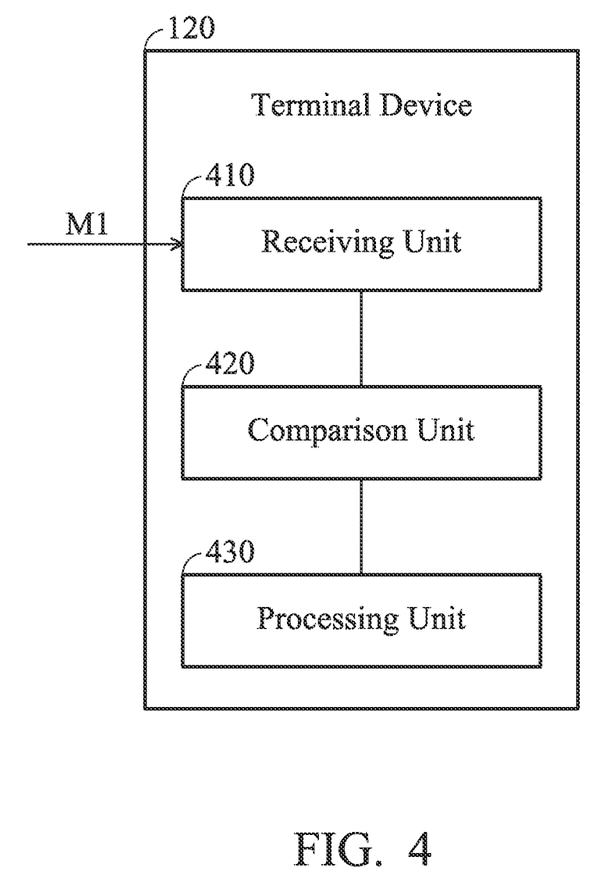
FIG. 4 shows a block diagram of the terminal device 120 according to a sixth embodiment of the present disclosure.

FIG. 4 shows a block diagram of the terminal device 120 according to a sixth embodiment of the present disclosure. In the sixth embodiment, the terminal device 120 comprises a receiving unit 410, a comparison unit 420, and a processing unit 430. The receiving unit 410 is used to receive a message M1 broadcasted with a base station, wherein the message M1 comprises a plurality of check values respectively corresponding to different types of applications.

In the sixth embodiment, the comparison unit 420 is used to select the check value corresponding to a specific application initiated by the terminal device and to perform a persistence test to initiate a call to the base station for the specific application according to the selected check value. The comparison unit 420 also generates a threshold value for comparing with the selected check value, wherein the persistence test is passed only when the selected check value is less than the threshold value. In the sixth embodiment, the processing unit 430 is used to request a MAC layer of the terminal device to initiate an access procedure of the call when the persistence test is passed. In the sixth embodiment, the receiving unit 410, the comparison unit 420, and the processing unit 430 can be utilized in hardware, in a software unit run by a processor, or a combination of the two.

In the sixth embodiment, the message M1 further comprises a waiting interval and a retry count. When the selected check value is larger than or equal to the threshold value, the comparison unit 430 waits for the waiting interval T1 to perform the persistence test again. The retry count X1 is used to determine a maximum number of times for repeatedly performing the persistence test.

Figure 5:
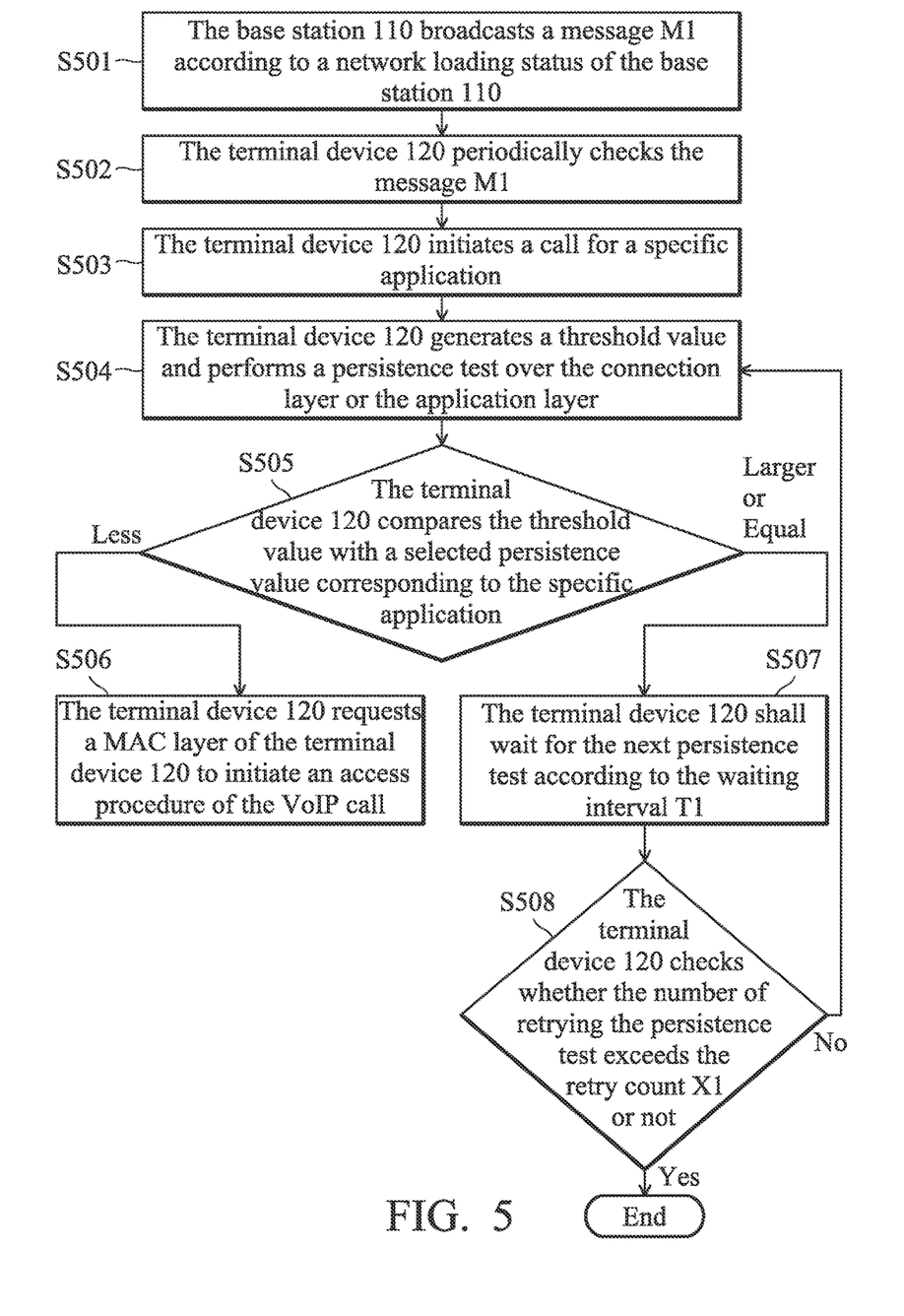
FIG. 5 shows a flow diagram 50 of a call control method of the communication system 10 according to a seventh embodiment of the present disclosure.

FIG. 5 shows a flow diagram 50 of a call control method of the communication system 10 according to a seventh embodiment of the present disclosure. In step S501, the base station 110 broadcasts a message M1 according to a network loading status of the base station 110, wherein the message M1 comprises a plurality of persistence values corresponding to the different types of applications, a waiting interval T1, and a retry count X1. In step S502, the terminal device 120 periodically checks the message M1 broadcasted from the base station 110. In step S503, the terminal device 120 receives the message M1 from the base station 110 and initiates a call for a specific application (for example, initiating a VoIP call). In step S504, the terminal device 120 generates a threshold value and performs a persistence test over the connection layer or the application layer.

In step S505, the terminal device 120 compares the threshold value with a selected persistence value corresponding to the specific application. If the persistence value A is less than the threshold value, the call control method proceeds to S506. Otherwise, the call control method proceeds to S507. In step S506, the terminal device 120 passes the persistence test and then requests a MAC layer of the terminal device 120 to initiate an access procedure of the VoIP call. In step S507, the terminal device 120 shall wait for the next persistence test according to the waiting interval T1, and then the call control method proceeds to S508. In step S508, the terminal device 120 checks whether the number of retrying the persistence test exceeds the retry count X1 or not. The call control method proceeds to step S504 only if the number of retrying the persistence test is less than the retry count X1.

Figure 6:
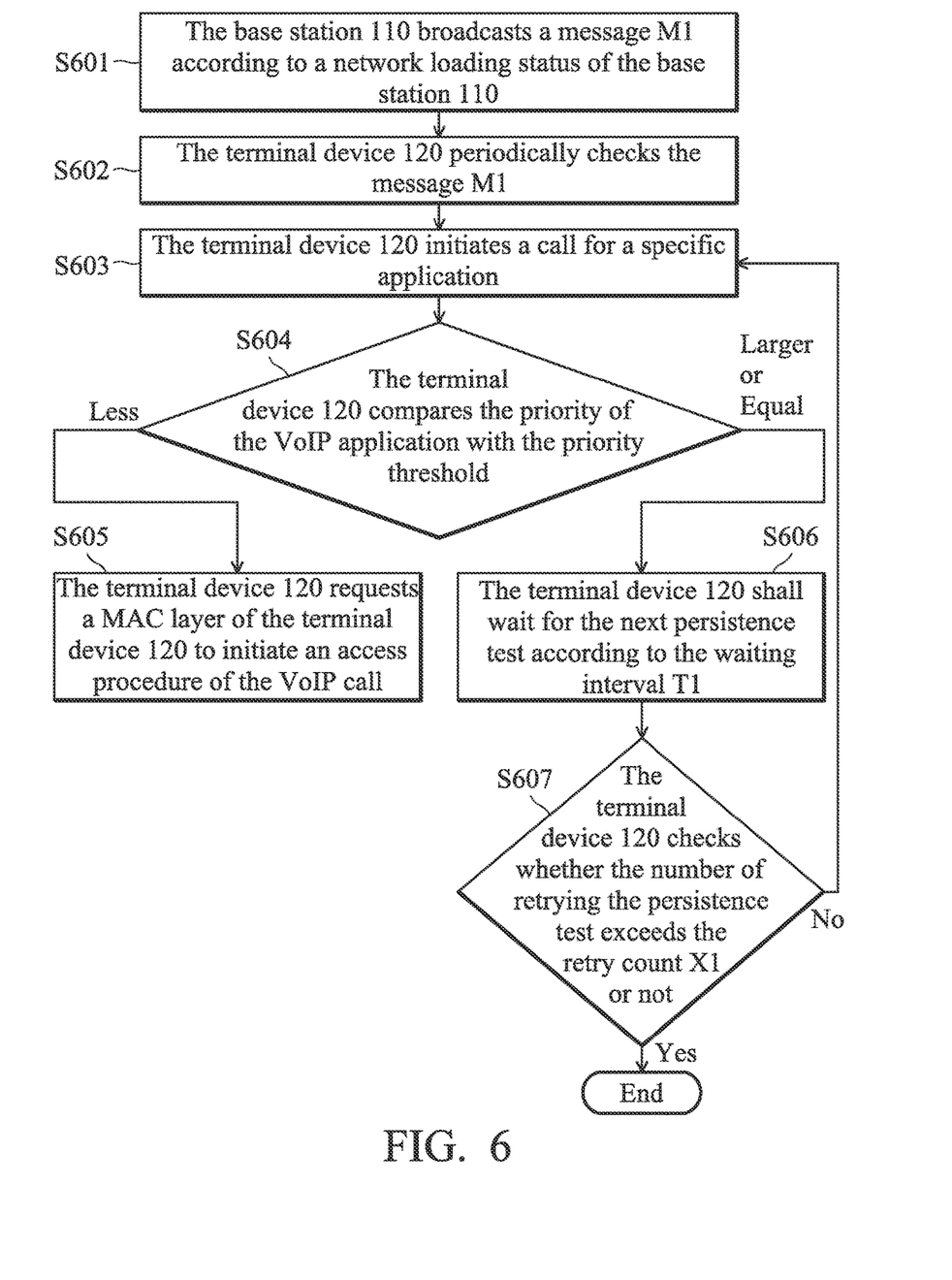
FIG. 6 shows a flow diagram 60 of a call control method of the communication system 10 according to an eighth embodiment of the present disclosure.

FIG. 6 shows a flow diagram 60 of a call control method of the communication system 10 according to an eighth embodiment of the present disclosure. In step S601, the base station 110 broadcasts a message M1 according to a network loading status of the base station 110, wherein the message M1 comprises a mapping between different types of applications and its priority, a priority threshold, a waiting interval T1, and a retry count X1. In step S602, the terminal device 120 periodically checks the message M1 broadcasted from the base station 110.

In step S603, the terminal device 120 receives the message M1 from the base station 110 and initiates a call for a specific application (for example, initiating a VoIP call). In step S604, the terminal device 120 compares the priority of the VoIP application with the priority threshold. If the priority of the VoIP application is less than the priority threshold, the call control method proceeds to S605. Otherwise, the call control method proceeds to S606.

In step S605, the terminal device 120 passes the persistence test and then requests a MAC layer of the terminal device 120 to initiate an access procedure of the VoIP call. In step S606, the terminal device 120 shall wait for the next persistence test according to the waiting interval T1, and then the call control method proceeds to S607. In step S607, the terminal device 120 checks whether the number of retrying the persistence test exceeds the retry count X1 or not. The call control method proceeds to step S603 only if the number of retrying the persistence test is less than the retry count X1.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the present disclosure has been described by way of example and in terms of preferred embodiment, it should be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A call control method, comprising:
   broadcasting a message using a base station, wherein the message comprises a plurality of check values respectively corresponding to different types of applications;
   broadcasting a priority threshold with the base station, wherein the plurality of check values correspond to priorities of the different types of applications, and the priority threshold is used for a persistence test;
   receiving the message with a terminal device;
   selecting, with the terminal device, a check value corresponding to a specific application initiated by the terminal device;
   performing, with the terminal device, persistence test to initiate a call to the base station for the specific application according to the selected check value; and
   requesting a MAC layer of the terminal device to initiate an access procedure of the call when the persistence test is passed, wherein the persistence test is passed when the selected check value is less than the priority threshold.

2. The call control method of claim 1, further comprising:
   adjusting, with the base station, the check values of the message according to a network loading status of the base station; and
   broadcasting the message with the base station after the check values of the message have been changed.

3. The call control method of claim 2, wherein performing the persistence test further comprising:
   generating, with the terminal device, a threshold value for comparing with the selected check value, wherein the persistence test is passed only when the selected check value is less than the threshold value.

4. The call control method of claim 3, wherein the message further comprising:
   a waiting interval, wherein when the selected check value is larger than or equal to the threshold value, the terminal device waits for the waiting interval to perform the persistence test again; and
   a retry count, used to determine a maximum number of times for repeatedly performing the persistence test.

5. The call control method of claim 2, further comprising:
   receiving the priority threshold with the terminal device.

6. The call control method of claim 5, wherein the message further comprising:
   a waiting interval, wherein when the selected check value is larger than or equal to the priority threshold, the terminal device waits for the waiting interval to perform the persistence test again; and
   a retry count, used to determine a maximum number of times for repeatedly performing the persistence test.

7. A communication system, comprising:
   a base station to:
      broadcast a message, wherein the message comprises a plurality of check values respectively corresponding to different types of applications; and
      broadcasting a priority threshold, wherein the plurality of check values correspond to priorities of the different types of applications, and the priority threshold is to be used for a persistence test; and
   a terminal device used to receive the message and select a check value corresponding to a specific application initiated by the terminal device, wherein the terminal device performs a persistence test to initiate a call to the base station for the specific application according to the selected check value; and
   wherein the terminal device requests a MAC layer of the terminal device to initiate an access procedure of the call when the persistence test is passed, and the persistence test is passed when the selected check value is less than the priority threshold.

8. The communication system of claim 7, wherein the base station adjusts the check values of the message according to a network loading status of the base station; and
   wherein the base station broadcasts the message after the check values of the message have been changed.

9. The communication system of claim 8, wherein when the terminal device performs the persistence test, the terminal device generates a threshold value for comparing with the selected check value; and
   wherein the persistence test is passed only when the selected check value is less than the threshold value.

10. The communication system of claim 9, wherein the message further comprising:
    a waiting interval, wherein when the selected check value is larger than or equal to the threshold value, the terminal device waits for the waiting interval to perform the persistence test again; and
    a retry count, used to determine a maximum number of times for repeatedly performing the persistence test.

11. The communication system of claim 8, wherein the message further comprising:
    a waiting interval, wherein when the selected check value is larger than or equal to the priority threshold, the terminal device waits for the waiting interval to perform the persistence test again; and a retry count, used to determine a maximum number of times for repeatedly performing the persistence test.

12. A call control method adapted to a base station, comprising:
broadcasting a message to a plurality of terminal devices with the base station, wherein the message comprises a plurality of check values respectively corresponding to different types of applications;
broadcasting a priority threshold with the base station, wherein the plurality of check values correspond to priorities of the different types of applications, and the priority threshold is used for a persistence test; and
adjusting, with the base station, a check values of the message according to a network loading status of the base station, wherein the message is received by each of the terminal devices and each of the terminal devices performs a persistence test to initiate a call to the base station for a specific application initiated by the terminal device according to the check value corresponding to the specific application, wherein the persistence test is passed when the selected check value is less than the priority threshold.

13. The call control method of claim 12, wherein the message further comprising:
a waiting interval, wherein when the persistence test fails, the terminal device waits for the waiting interval to perform the persistence test again; and
a retry count, used to determine a maximum number of times for repeatedly performing the persistence test.

14. The call control method of claim 13, further comprising:
adjusting, with the base station, the priority threshold according to the network loading status of the base station.

15. A call control method adapted to a terminal device, comprising:
receiving, with the terminal device, a message broadcasted by a base station, wherein the message comprises a plurality of check values respectively corresponding to different types of applications;
receiving, with the terminal device, a priority threshold broadcasted by the base station, wherein the plurality of check values correspond to priorities of the different types of applications, and the priority threshold is used for a persistence test;
selecting, with the terminal device, a check value corresponding to a specific application initiated by the terminal device;
performing, with the terminal device, a persistence test to initiate a call to the base station for the specific application according to the selected check value; and
requesting a MAC layer of the terminal device to initiate an access procedure of the call when the persistence test is passed, wherein the persistence test is passed when the selected check value is less than the priority threshold.

16. The call control method of claim 15, wherein performing the persistence test further comprising:
generating, with the terminal device, a threshold value for comparing with the selected check value, wherein the persistence test is passed only when the selected check value is less than the threshold value.

17. The call control method of claim 16, wherein the message further comprising:

a waiting interval, wherein when the selected check value is larger than or equal to the threshold value, the terminal device waits for the waiting interval to perform the persistence test again; and
a retry count, used to determine a maximum number of times for repeatedly performing the persistence test.

18. A base station, comprising:
a broadcasting unit to:
broadcast a message to a plurality of terminal devices, wherein the message comprises a plurality of check values respectively corresponding to different types of applications; and
broadcast a priority threshold with the base station, wherein the plurality of check values correspond to priorities of the different types of applications, and the priority threshold is used for a persistence test; and
an adjustment unit, used to adjust check values of the message according to a network loading status of the base station, wherein the message is received by each of the terminal devices and each of the terminal devices performs a persistence test to initiate a call to the base station for a specific application initiated by each of the terminal devices according to the check value corresponding to the specific application, wherein the persistence test is passed when the selected check value is less than the priority threshold.

19. The base station of claim 18, wherein the message further comprising:
a waiting interval, wherein when the persistence test fails, the terminal device waits for the waiting interval to perform the persistence test again; and
a retry count, used to determine a maximum number of times for repeatedly performing the persistence test.

20. The base station of claim 19, wherein the adjustment unit is further to adjust the priority threshold according to the network loading status of the base station.

21. A terminal device, comprising:
a receiving unit to:
receive a message broadcasted by a base station, wherein the message comprises a plurality of check values respectively corresponding to different types of applications; and
receive a priority threshold broadcasted by the base station, wherein the plurality of check values correspond to priorities of the different types of applications, and the priority threshold is used for a persistence test;
a comparison unit, used to select a check value corresponding to a specific application initiated by the terminal device and to perform a persistence test to initiate a call to the base station for the specific application according to the selected check value; and
a processing unit, used to request a MAC layer of the terminal device to initiate an access procedure of the call when the persistence test is passed, wherein the persistence test is passed when the selected check value is less than the priority threshold.

22. The terminal device of claim 21, wherein performing the persistence test further comprising:
generating, with the comparison unit, a threshold value for comparing with the selected check value, wherein the persistence test is passed only when the selected check value is less than the threshold value.

23. The terminal device of claim 22, wherein the message further comprising:

a waiting interval, wherein when the selected check value is larger than or equal to the threshold value, the comparison unit waits for the waiting interval to perform the persistence test again; and a retry count, used to determine a maximum number of times for repeatedly performing the persistence test.

* * * * *